United States Patent [19]

Brinster et al.

[11] Patent Number: 5,259,251
[45] Date of Patent: Nov. 9, 1993

[54] DEVICE FOR COUNTING ROTATIONS

[75] Inventors: Daniel Brinster, Mulhouse; Eric Perrin, Saint-Louis Bourgfelden, both of France

[73] Assignee: Sappel, Saint Louis, France

[21] Appl. No.: 790,831

[22] Filed: Nov. 12, 1991

[30] Foreign Application Priority Data

May 16, 1990 [FR] France ................... 90 06099

[51] Int. Cl.$^5$ ................................ G01F 1/075
[52] U.S. Cl. ........................ 73/861.77; 377/21
[58] Field of Search ................ 73/861.77; 377/21

[56] References Cited

U.S. PATENT DOCUMENTS 4,061,901 12/1977 Saunders et al. ................ 377/21
4,253,341 3/1981 Ikeda et al. ................ 73/861.77

FOREIGN PATENT DOCUMENTS 2593290 7/1987 France .
2020817 11/1979 United Kingdom .
2123556 2/1984 United Kingdom .
2123557 2/1984 United Kingdom ........... 73/861.77

Primary Examiner—John S. Heyman
Attorney, Agent, or Firm—Browdy and Neimark

[57] ABSTRACT

The invention pertains to a rotation gauge for a water meter register where the hydraulic part of the meter rotates a shaft whose revolutions are to be counted. At the other end of the shaft at least one magnet is driven by rotation by the shaft. Outside this hydraulic part, two flexible blade switches are mounted opposite the path of said magnet and connected to an electronic circuit which provides a register with metering pulses. The metering pulses are characterized by the fact that each of triggered by the closing of the first flexible blade switch and stopped by the closing of the second switch. The second switch is closed substantially in the middle of the period during which the first remains closed.

7 Claims, 1 Drawing Sheet

DEVICE FOR COUNTING ROTATIONS

BACKGROUND OF THE INVENTION

Flexible blade switches have two metal blades whose ends come into mutual contact which closes a circuit in which the switch is mounted when they are exposed to an appropriate magnetic field. Because of the elasticity of the blades, the switch opens again when the magnetic field disappears.

Such a switch has been mounted in the "dry" part of a fluid meter, i.e., the part located outside of its hydraulic part, and if it is placed opposite to the trajectory of a magnet fixedly attached to the meter shaft but offset with respect thereto, the magnet passes by the switch one time for each revolution of the shaft and closes it for a brief instant.

It is sufficient to count the number of times the switch closes to deduce the number of revolutions the shaft makes. The volume of fluid which has passed through the meter is easily determined by using a meter which rotates proportionally to the volume of the fluid passing through it. The number of switch closing may be recorded by electronic registers well-known to those skilled in the art and can perform such operations, and therefore will not be described here.

The gauges described above were next improved by adding a second flexible blade switch, also located on the circular path of the magnetic field, but angularly offset 90° from the first, which also makes it possible to detect the direction in which the shaft is rotating. Clearly, depending on the rotational direction, the second switch will close after the first at a 90° or 270° angular interval. As a result, there is a time interval between these two closing instants which is greater than or less than the following one. One of ordinary skill in the art can easily buy or design a logic circuit to compare this time interval and use this comparison to determine the rotational direction.

These known gauges nonetheless present a number of disadvantages, the most significant of which is related to flexible blade switch itself. Because the blades of said switches tend to undergo a rebound effect owing to their elasticity, the measurements may be inaccurate especially when the meter shaft is rotating at a high speed. Other perturbations can result from the dimensional inaccuracy and drift over time which occurs in flexible blade switches. Therefore, one may have an inaccurate measurement of the number or direction of rotations.

SUMMARY OF THE INVENTION

The object of this invention is to correct the problems from the rebound effect presented above and to provide precise measurements, free of perturbations and which remains stable over time.

According to the invention, these goals and others which will appear below, such as that of providing a gauge at a cost low enough to remain compatible with the sale price of a water meter for home use, are reached with a rotation gauge two having magnetically responsive flexible blade switches so that each of its metering pulses is triggered by the closing of the first of the two flexible blade switches specified above and stopped by the closing of the second. One additional desirable condition is that the second switch closes substantially in the middle of the closing period of the first.

DETAILED DESCRIPTION OF THE INVENTION

Figure 2:
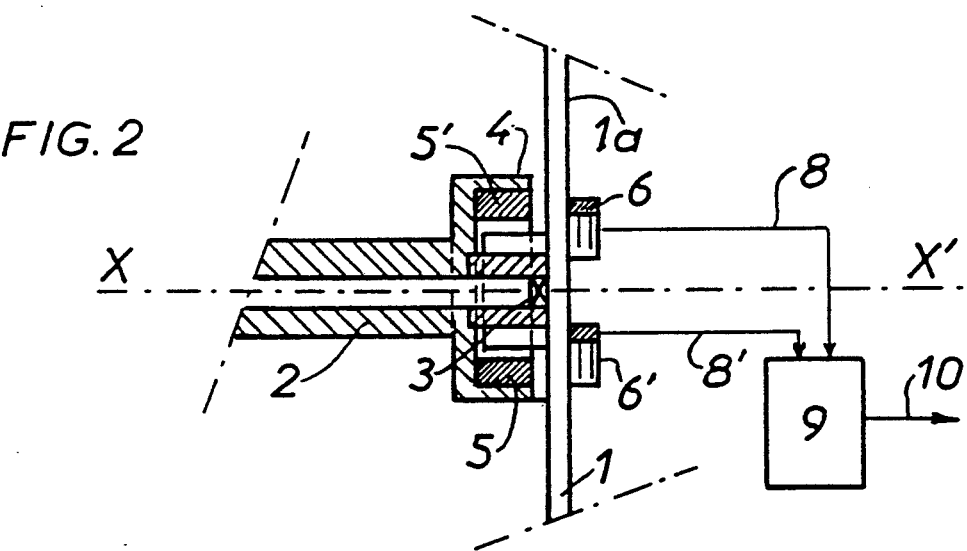
FIG. 2 is a cross section view along line II—II in FIG. 1 showing the shaft of the fluid meter.

The hydraulic part of a water meter (not shown) is located to the left of the sectional view in FIG. 2 and is ended on the right by a watertight partition 1. It comprises a shaft 2 whose X—X' axis is perpendicular to wall 1 and whose rotational speed is proportional to the flow rate of the water or fluid passing through the meter. One may deduce the total volume of water which has passed through the meter by simply adding the number of its rotations.

The end of shaft 2 rotates in a bearing 3 fixedly attached to partition 1, and it holds supporting end ring 4 inside which is mounted a permanent ring magnet having two diametrically-opposed poles 5 and 5'. The free edge or ring 4 and its magnet are separated from wall 1 by a very thin airgap.

On the outside surface of wall 1, called on the "dry" side of the installation, two flexible blade switches 6 and 6' are mounted, whose active part is located at a right angle with the path of magnet poles 5 and 5'. A projection of the path of the magnets is shown by a ring in broken lines 7 in FIG. 1, on the plane of the outside surface of the watertight partition.

Furthermore, these flexible blade switches 6 and 6' are placed on ring 7 so as to be activated by magnet 5, 5' with a slight phase shift such that second switch 6' is activated, i.e., closed when 6 is in the maximum field zone.

Figure 1:
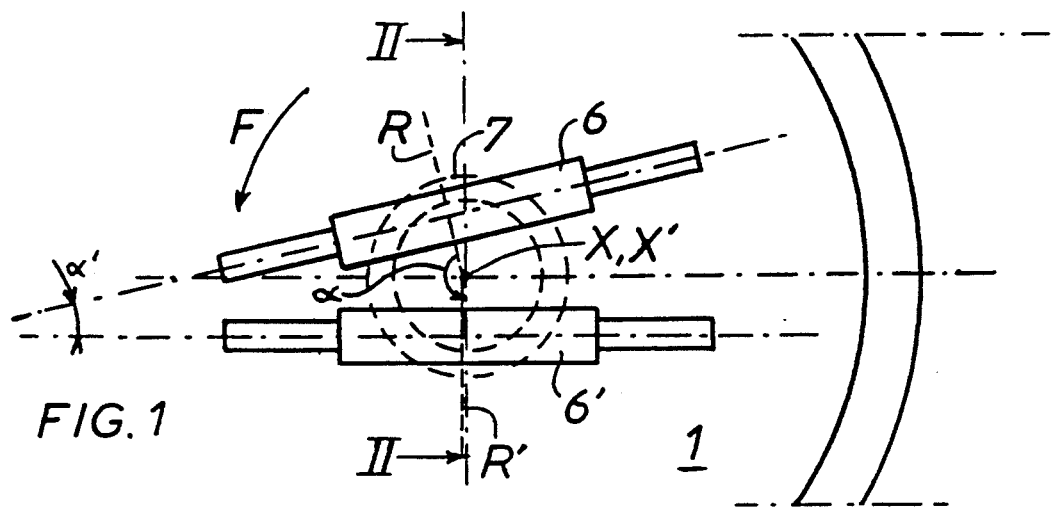
FIG. 1 is a schematic top view of the rotation gauge of the invention.

As shown in FIG. 1, said condition is fulfilled because the active part of second switch 6' is offset from that of 6 in the rotational direction of shaft 2, indicated by Arrow F, by an angle $\alpha$ which is equal to 168° in this example. Another way to measure the angle is if we measure R and R' the rays of which run from the X—X' axis of shaft 2 to switches 6 and 6', the angle (R, R') oriented toward Arrow F is equal to 168° in this example. Of course, the result of this is an angle $\alpha'$ formed by the longitudinal axes of the two switches 6 and 6' is 12° (equal to 180°−168°=12°).

The signals which come from switches 6 and 6', which are binary signals corresponding to the opening or closing of said switches, are sent by respective conductors 8 and 8' to an electronic circuit 9. They are represented by S1 and S2 in FIG. 3 respectively. We note that switch 6' closed at time $I_2$ which is in the middle of closing phase $I_1$-$I_1'$: of switch 6, as desired.

The value which must be assigned to angle $\alpha$ to reach this goal depends primarily on the characteristics of magnet 5, 5', and it can be determined in each case using routine optimization. The value of 168° provided above corresponds simply to a particular embodiment provided as an example. One may use any angle and any configuration of magnets provided that the pulses formed by S1 and S2 are not opposite or identical in time.

The goal of this arrangement is to make switch 6' close at an optimal instant so that variations and deviations owing to inaccurate dimensions or the drift of flexible blade switches 6 and 6' and of magnet 5, 5' cannot offset signal S2 from signal S1 to the extent that instant $I_2$ occurs outside of the interval $I_1$-$I_1'$.

It is understood that the arrangement of the invention eliminates the perturbing rebound effect of the flexible blade switches on metering, because the ascending and descending fronts of each metering pulse are both generated by the closing of the corresponding switch, and thus before its rebounds appear. Therefore, these rebounds cannot have any influence on the pulse.

Another advantage is that the second flexible blade switch closes substantially in the middle of the time interval during which the first remains closed. This prevents variations and deviations owing to the dimensional inaccuracy or the drift of the flexible blade switches from offsetting the signals produced by the latter to the point of perturbing the metering pulses.

In a particularly advantageous embodiment of a gauge according to the invention, the timing of when the flexible blade switches closes is met by the second flexible blade switch being aligned angularly distant from the first around the axis of the magnet which is fixedly attached to the rotating shaft embedded in the hydraulic part of the meter. Any angle other than 0° and 180° may be used, but an angle which is between about 185° and about 210°, and preferably between about 190° and about 195° have been found to be particularly advantageous. The key aspect of that the second switch must close in the middle of the closing period of the first.

The optimal value of the angle between said two switches within the accepted angles specified above depends primarily on the power of the magnet which is used, its configuration, number and concentration of poles and the distance separating it and the switches. A ring magnet is preferred for obvious reasons of symmetry but one or more bar magnets are acceptable. With routine experimentation one can determine optimal configurations for each design.

This respective arrangement of the two flexible blade switches is very easy to produce in practice if the magnet is fixedly attached to the shaft and the flexible blade switches are placed opposite it, beyond the end of the shaft. A watertight non-magnetic partition is preferably between said end and the switches. This arrangement presents the additional advantage of generating an appreciable space gain in comparison with the conventional solution in which the flexible blade switches are distributed on the periphery of the end of the shaft holding the magnet or magnets. Furthermore, the partition positioned between said magnets and the flexible blade switches makes it possible to ensure perfect watertightness between the hydraulic part and the "dry" part of the meter counting the revolutions.

The conditions which the invention imposes on the flexible blade switches of the gauge still allow the order of closing of the switches to be detected, and from this the determination of the rotational direction of the shaft. This shaft is connected to a volumetric wheel or other fluid measuring system and the magnet or magnets of the meter are connected to the other end of the shaft.

Furthermore, the electronic circuit which produces the metering pulses of the gauge may have a mechanism to change the sign of said pulses depending on the rotational direction of the shaft. If the register of the device can operate by counting and by adding or subtracting the number of pulses depending on the sign, it becomes possible to count the volumes of fluid to be added or subtracted depending on the direction in which they pass through the meter.

Figure 3:
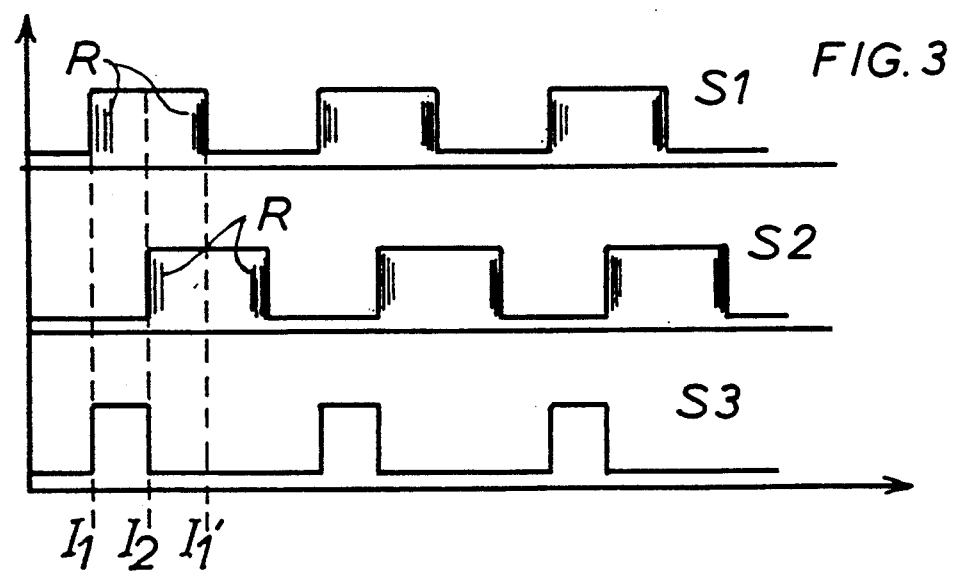
FIG. 3 is a graph of the various signals emitted by the device in FIGS. 1 and 2 over time when the meter is rotated.

With this being the case, electronic circuit 9 next uses signals S1 and S2 generated in this manner by flexible blade switches 6 and 6' to generate metering pulses which are labelled S3 in FIG. 3 and which begin whenever switch 6 is activated and end with the immediately consecutive activation of switch 6'. Logic circuits making it possible to produce this result are well-known to one of ordinary skill in the field and will thus not be described in detail here.

In any event, as the result of the method used to generate the metering pulses, unwanted rebounds which are labelled R in FIG. 3, which are inevitable because they are related to flexible blade switch technology, have no effect on the metering because the metering pulses are triggered by ascending signal fronts of S1 and S2. These signals must intervene before the switches' closing rebounds and must be stopped before the opening rebounds, as shown in FIG. 3 as S3. Therefore, any rebounding would not be counted by the meter.

The metering pulses provided by electronic circuit 9 are sent by a conductor 10 to a pulse register (not shown) where they are processed in a manner known per se. This yields the total number of revolutions of shaft since the measurements began or since resetting to zero. As the number of revolutions is directly related to the volume of fluid which has passed through the meter, one can calculate the volume of fluid which passed.

When shaft 1 rotates in the opposite direction of arrow F, one obtains subtracted pulses which begin when second switch 6' closes and which end when first switch 6 closes. In this situation again, unwanted rebounds have no effect on these pulses.

Electronic circuit 9 makes it possible to determine the rotational direction of shaft 1 by detecting whether the signals from switch 6 or switch 6' are the first to arrive. This detection is possible because the angular offsetting between switch 6 and switch 6'. This corresponds to an offsetting in time which can easily be determined. One of ordinary skill in the art can easily buy or make a logic circuit which enables this detection to be made, and thus it will not be described here in detail.

The inversion of the rotational direction of shaft 1 causes a sign change in the pulses generated by electronic circuit 9. The register adds the positive pulses and subtracts the negative pulses so that the volumes of fluid can be added or subtracted, depending on whether they pass through the meter in one direction or the other. Alternatively, the quantities of fluid passing through the meter in one direction can be displayed separately from those passing through in the other direction.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A fluid meter comprising, a hydraulic part of a meter and a non-hydraulic part,
   wherein the hydraulic part comprises a shaft connected to a volumetric wheel driven by fluid passing through said meter and by at least one magnet driven by rotation of said shaft, and
   wherein said non-hydraulic part comprises, two flexible blade switches mounted opposite the path of said magnet and connected to an electronic circuit which counts their closings of said switches to provide a register with metering pulses,
   whereby the switches are so aligned that each of said metering pulses is triggered by the closing of a first flexible blade switch and stopped by the closing of the other switch and the other switch is initially closed substantially in the middle of the closed period of the first.

2. The fluid meter according to claim 1, characterized by the fact that flexible blade switches are place at an angle of between about 185° to about 210° around the axis of the path of said magnet with respect to each other.

3. The fluid meter according to claim 2, where said angle is between about 190° and about 195°.

4. The fluid meter of claim 1 where in said magnet is a ring magnet.

5. The fluid meter of claim 1 further comprising a watertight partition wherein said magnet is fixed on the end of said shaft, and said flexible blade switches are placed opposite it, beyond the end of said shaft and said watertight partition is between said magnet and said switches.

6. The fluid meter of claim 1 wherein said electronic circuit comprises means to detect which of said switches is the first to close, whereby the rotational direction of said shaft can be deduced and to provide metering pulses whose sign depends on said rotational direction.

7. The fluid meter of claim 6, further comprising a register which adds or subtracts the metering pulses provided by said electronic circuit depending on the sign.

* * * * *